United States Patent
Leblon et al.

(10) Patent No.: US 12,537,474 B2
(45) Date of Patent: Jan. 27, 2026

(54) SYSTEM AND METHOD FOR DETERMINING A QUANTITY IN A MOTOR VEHICLE

(71) Applicant: Vitesco Technologies GmbH, Regensburg (DE)

(72) Inventors: Michael Leblon, Bressols (FR); Nicolas Lamarque, Colomiers (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/860,767

(22) PCT Filed: Jun. 12, 2023

(86) PCT No.: PCT/EP2023/065599
§ 371 (c)(1),
(2) Date: Oct. 28, 2024

(87) PCT Pub. No.: WO2023/242088
PCT Pub. Date: Dec. 21, 2023

(65) Prior Publication Data
US 2025/0317087 A1    Oct. 9, 2025

(30) Foreign Application Priority Data
Jun. 17, 2022  (FR) ...................... 2205960

(51) Int. Cl.
*H02P 29/60*  (2016.01)
*B60W 40/12*  (2012.01)
*G06N 3/09*  (2023.01)

(52) U.S. Cl.
CPC ............. *H02P 29/60* (2016.02); *B60W 40/12* (2013.01); *G06N 3/09* (2023.01)

(58) Field of Classification Search
CPC ......... F02D 41/1405; F02D 2041/1433; H02P 29/60; H02P 29/66; B60W 40/12; G06N 3/09; G06N 20/00
See application file for complete search history.

(56) References Cited

U.S. PATENT DOCUMENTS

| | | | |
|---|---|---|---|
| 8,478,506 B2 | 7/2013 | Grichnik et al. | |
| 11,951,833 B1 * | 4/2024 | Wu | B60K 35/00 |

(Continued)

FOREIGN PATENT DOCUMENTS

| | | | | |
|---|---|---|---|---|
| DE | 102008001081 B4 | 11/2021 | | |
| EP | 3967565 A1 * | 3/2022 | ............. | B60T 8/172 |

(Continued)

OTHER PUBLICATIONS

International Search Report (PCT/ISA/210) and Written Opinion (PCT/ISA/237) with translation mailed on Sep. 7, 2023, by the European Patent Office as the International Searching Authority for International Application No. PCT/EP2023/065599. (28 pages).

*Primary Examiner* — Grant Moubry
(74) *Attorney, Agent, or Firm* — Buchanan Ingersoll & Rooney PC

(57) ABSTRACT

A method and system for determining iteratively a quantity of interest used to control at least one component of a motor-vehicle powertrain. The system includes a supervised-learning-based estimating module, for example a neural network, which receives as input a set of first input data, and delivers as output at least one intermediate output quantity, a likelihood-checking module, which receives as input the set of first input data and a set of second input data, and which delivers as output a likelihood index, a downstream processing module which receives as input the likelihood index and the intermediate output quantity, and which delivers as output a final output quantity. When the likelihood index is good, the final output quantity is obtained (Continued)

from the intermediate output quantity, otherwise the final output quantity is obtained from a model of a physical representation.

16 Claims, 3 Drawing Sheets

(56) References Cited

U.S. PATENT DOCUMENTS

| | | |
|---|---|---|
| 2013/0110749 A1 | 5/2013 | Streichert et al. |
| 2018/0154899 A1* | 6/2018 | Tiwari ................ B60W 50/082 |
| 2020/0285997 A1 | 9/2020 | Bhattacharyya et al. |
| 2021/0056778 A1 | 2/2021 | Wylie et al. |
| 2021/0325469 A1* | 10/2021 | Torai .................... G01R 31/367 |
| 2021/0382586 A1* | 12/2021 | Bielby ................. G06F 3/0482 |
| 2022/0292605 A1* | 9/2022 | Sanchez ............... G06V 20/597 |
| 2023/0177344 A1* | 6/2023 | Balazevic .......... G06V 10/7753 |
| | | 382/155 |

FOREIGN PATENT DOCUMENTS

| | | | | |
|---|---|---|---|---|
| WO | 9605421 A1 | 2/1996 | | |
| WO | WO-2021060469 A1 * | 4/2021 | ............ | B60W 40/10 |

* cited by examiner

SYSTEM AND METHOD FOR DETERMINING A QUANTITY IN A MOTOR VEHICLE

CROSS REFERENCE TO RELATED APPLICATIONS

This application is the U.S. National Phase Application of PCT International Application No. PCT/EP2023/065599, filed Jun. 12, 2023, which claims priority to French Application No. 2205960, filed Jun. 17, 2022, the contents of such applications being incorporated by reference herein.

FIELD OF THE INVENTION

The present invention relates to methods for determining a quantity with a view to controlling at least one component of a motor-vehicle powertrain, in particular when said quantity is not measured directly by a sensor. In this case, it is necessary to estimate said quantity from other information and/or other parameters.

Throughout the text, the (combustion or electric) powertrain refers to all the components directly or indirectly involved in the traction of the vehicle, and may include ancillary treatment components such as pollution-removing components.

The quantity is at least one physical parameter. It is advantageously a temperature, for example a temperature of a rotor of an electric motor, or a temperature of a battery powering an electric motor, or a temperature of an electronic power component, or a fuel temperature upstream of injection into the cylinders, etc. However, the invention is not limited to the case where the quantity of interest is a temperature. In any case, the quantity of interest relates to at least one parameter the value of which is used by at least one computer to control at least one component of the powertrain.

In production-vehicle configurations, it is not possible to envision a sensor measuring these quantities directly.

BACKGROUND OF THE INVENTION

Estimating systems are known that use a model based on the laws of physics, to determine an estimate of the quantity of interest. The model uses measurable quantities. Using algorithmic functions, it is able to deliver as output an estimate of the quantity of interest, even though it is not directly measurable.

It is also known to use a neural network ('NN' for short) trained by supervised learning. The learning domain is limited to supervised learning operations. Thus, there remain gaps in the coverage of the learning cases used to train the NN. In practice, coverage is therefore incomplete. There is therefore a risk of divergence of the output quantity, should cases not covered by the experimental plan of the learning situations used to train the neural network be encountered.

The inventors have sought to improve the situation.

SUMMARY OF THE INVENTION

To this end, according to the present disclosure, a system for determining iteratively at least one quantity of interest in a vehicle motorization system is provided, said quantity of interest not being measured directly by a sensor, the system comprising:

- a supervised-learning-based estimating module, which receives as input a set of first input data $X_i$, and which delivers as output at least one intermediate output quantity Y,
- a likelihood-checking module, MK, which receives as input the set of first input data $X_i$ and a set of second input data $C_j$, and which delivers as output a likelihood index IK,
- a downstream processing module, which receives as input the likelihood index IK and the intermediate output quantity Y, and which delivers as output a final output quantity Z corresponding to said quantity of interest,
- the downstream processing module being configured so that:
  - when the likelihood index IK is good, the final output quantity Z is representative of the intermediate output quantity Y, and preferably equal to the latter;
  - when the likelihood index IK is bad, the final output quantity is in particular obtained from a model of a physical representation (or a "physical model", simply).

It will be noted that the supervised-learning-based estimating module may for example be a neural-network-based module. However, other types of supervised-learning-based modules may be considered, such as, for example, modules based on a decision tree, kernel regression, or a support-vector machine. The neural-network solution is now well known and easy to implement.

A likelihood index classed in the category "good" substantially relates to conditions covered by a learning plan of the supervised-learning-based estimating module, for example a neural-network-based module. A likelihood index classed in the category "bad" substantially relates to conditions not covered by a learning plan of the supervised-learning-based estimating module.

By "good" and "bad", what is therefore meant are two classes, or categories, for the likelihood index (IK), which are for example separated by one or more predetermined threshold values (depending on whether the likelihood index is a vector of one or more dimensions, for example). The at least one threshold value is advantageously predetermined, taking into account the known learning plan of the supervised-learning-based estimating module, and recorded in a memory of the downstream processing module.

In other words:

- when the likelihood index (IK) is good, the final output quantity Z is obtained using a model based on artificial intelligence, which model was obtained at the end of a preliminary learning step; and
- when the likelihood index (IK) is bad, the final output quantity Z is in particular obtained using a model of a physical representation based on the laws of physics.

Switching from a good likelihood index to a bad likelihood index therefore results in a switch from determining the final quantity by artificial intelligence, using the supervised-learning-based estimating module, to determining the final quantity using a physical model representing the variation in said quantity as a function of predetermined physical parameters.

This avoids the need to use an aberrant output of the supervised-learning-based estimating module in the case where the particular circumstantial conditions differ greatly from the domain covered by the supervised learning. In other words, when the current operational conditions are substantially outside the domain where the supervised learning took place, an open-loop physical model is fallen back upon. This open-loop physical model, which even if it is not very accurate, or in any case less accurate than the output of the supervised-learning-based estimating module, makes it possible to avoid employing aberrant values resulting from divergence of the supervised-learning-based estimating module (e.g. of the neural network).

In the most common cases, the final output quantity Z is determined using the supervised-learning-based estimating module. It then has a high accuracy, and obtaining it requires only limited computing power.

Cases where the final output quantity is determined using a model of a physical representation remain rare. It is therefore not necessary for the model of a physical representation to have a very high accuracy, and hence once more determining the final output quantity requires only limited computing power. Thus, an aspect of the invention makes it possible to provide a system for determining iteratively at least one quantity of interest, which requires a limited computing power (and consequently has a lower manufacturing cost and/or a high computing speed), while having on average a high accuracy.

The quantity of interest relates to at least one parameter, the value of which is used by at least one computer to control at least one component of the powertrain depending on the value taken by said quantity of interest.

It will be noted that the quantities Xi Cj Y and Z are time series of values. Xi and Ci are obtained from a sampling process and Y and Z are computed iteratively by the aforementioned modules. Thus, the notation Xi actually represents a time series $Xi(t_k)$, the notation Cj represents a time series $Cj(t_k)$, the notation Y represents a time series $Y(t_k)$, and the notation Z represents a time series $Z(t_k)$. The variable k is here an index of recurrence of the sampling and computation. The expression "the final output quantity Z is representative of the intermediate output quantity Y", must be understood to mean that the final output quantity Z may be directly equal to Y, or indeed correspond to values Y after application of a filter, a smoothing filter for example. In other words, $Z(t_k)=F3\ (Y(t_k))$, where the function F3 is for example a digital filter with smoothing and clipping.

Preferably:

$$Z = F\ (Ci, Xj, Y, t) + CT;$$

with:
Ci some at least of the input data belonging to the set of second input data, and preferably the whole set of second input data;
Xj some at least of the input data belonging to the set of first input data, and preferably the whole set of first input data;
Y the intermediate output quantity;
t a time measured from a last time of switching from a good likelihood index to a bad likelihood index (switch to the physical model); and
CT is a constant.

Preferably, the constant CT is able to establish a continuity in the values taken by the final output quantity Z, during the switch to the physical model.

In various embodiments of the invention, one or more of the following features may also be employed, alone or in combination.

According to one aspect, provision may be made, when the likelihood index IK changes from good to bad, at a time t1, for CT to be such that the output Z is free of discontinuity at the time t1. Advantageously, even in the event of switching to the solution of the open-loop model, no discontinuity is seen by the control functions using the quantity of interest.

According to one aspect, the function F is or uses an open-loop-model function (YR). Such a function is simple to implement and requires very little memory. The open-loop-model function YR is a fallback solution that is both good and reliable, even though it may be slightly less accurate than the output of the neural network.

According to an aspect of the invention, in the likelihood-checking module, the likelihood index characterizes a distance metric between the set of first input data (Xi) and a domain of first reference input data, and/or between the set of second input data (Ci) and a domain of second reference input data, and the likelihood index becomes "worse" the higher the value of the distance metric (MD).

Conversely, the likelihood index becomes "better" the lower the value of the distance metric.

The switch to the physical model may thus occur when the value of the distance metric exceeds a first predetermined threshold (MD1). Return to normal, i.e. to use of the output of the neural network, may occur when the value of the distance metric drops below a second predetermined threshold (MD2).

According to one aspect, the quantity of interest is a temperature of a component related to the vehicle motorization system, for example a temperature of a rotor of an electric motor, or a temperature of battery cells, or a temperature of an electronic power component, or a fuel temperature upstream of injection into the cylinders. The inventors have observed that a temperature measurement lends itself particularly well to application of the method and system described here.

According to one aspect, the quantity of interest is a temperature of a fluid of the vehicle motorization system, for example a temperature of a fuel. In a vehicle with an internal combustion engine, the temperature of certain fluids may have a substantial influence on the calibration of the way in which fuel injection and ignition is controlled.

According to yet other variants, the quantity of interest may be a flow rate of a fluid (for example air in a combustion engine) or liquid (for example a fuel or a coolant of components of the combustion engine or electric motor).

According to one aspect, the quantities Y and Z may be multidimensional quantities. For example, it may be a question of a plurality of temperatures estimated at various positions; for example, for a rotor of an electric traction motor, the temperature of the shaft, the temperature of the windings or of the permanent magnets, and/or a temperature gradient between one axial side and the other axial side of the rotor, may be considered.

According to one aspect, the downstream processing module comprises a digital-filtering function and/or a clipping function. The clipping function makes it possible to exclude any value that is aberrant or outside a normally expected interval, and the filtering function makes it possible to avoid abrupt changes in the control function using the quantity of interest.

According to another aspect, provision may be made for the three modules, namely the supervised-learning-based estimating module, the likelihood-checking module, and the downstream processing module to be contained in a single computing unit. It may be a question of a separate computing unit or of the at least one computer controlling at least one component of the powertrain depending on the value taken by said quantity of interest. Thus, in the case of a combustion-engine motorization system, the three modules are for example hosted directly in the engine control unit or in a powertrain supervisor. The same goes in the case of an electric motorization where the three modules may be implemented directly in the traction control unit or in an operation supervisor. As a variant, the three modules may be hosted in an auxiliary computing unit, connected to at least one auxiliary computer using the quantity of interest to control at least one component of the powertrain.

In other implementations, modules may be located in various units.

According to another aspect, the final output quantity (Z) is computed at a frequency at least equal to once per second. Thus, the computational iteration is quite fast and delivery of information on the quantity of interest is achieved and refreshed in real time.

According to another aspect, the invention also relates to a method for determining iteratively at least one quantity of interest used to control at least one component of a motor-vehicle powertrain, said quantity of interest not being measured directly by a sensor, the method comprising:
  providing a set of first input data X,
  injecting the set of first input data into a supervised-learning-based estimating module,
  obtaining as output at least one intermediate output quantity Y,
  providing a set of second input data C,
  injecting the set of first input data X and the set of second input data C into a likelihood-checking module and obtaining as output a likelihood index (IK),
  injecting the intermediate output quantity Y and the likelihood index IK into a downstream processing module, which delivers as output a final output quantity Z corresponding to said quantity of interest,
  when the likelihood index IK is good, choosing as final output quantity Z a value representative of the intermediate output quantity Y,
  when the likelihood index IK is bad, choosing as final output quantity values in particular obtained from a model of a physical representation.

An aspect of the invention particularly relates to a method for iteratively determining at least one quantity of interest in a vehicle motorization system.

As detailed above, advantageously, when the likelihood index (IK) is bad, the final output quantity is obtained from a function F defined by:

$$Z = F\ (Ci, Xj, Y, t) + CT;$$

with:
Ci some at least of the data of the set of second input data;
Xj some at least of the data of the set of first input data;
Y the intermediate output quantity;
t a time since a last switch from a good likelihood index to a bad likelihood index; and
CT is a constant.

According to an aspect of the invention, in the likelihood-checking module, the likelihood index characterizes a distance metric between the set of first input data (Xi) and a domain of first reference input data, and/or between the set of second input data (Ci) and a domain of second reference input data, and the likelihood index becomes "worse" the higher the value of the distance (MD).

Conversely, the likelihood index becomes "better" the smaller the distance.

The switch to the physical model may thus occur when the value of the distance metric exceeds a first predetermined threshold (MD1). Return to normal, i.e. to use of the output of the neural network, may occur when the value of the distance metric drops below a second predetermined threshold (MD2).

According to one aspect, when the likelihood index IK changes from good to bad, at a time t1, CT is such that the output Z is free of discontinuity at the time t1.

Furthermore, when the likelihood index IK changes from bad to good, at a time t2, the output Z switches to the output of the neural network, possibly with a discontinuity at the time t2.

In addition, by virtue of a gradual switching system (relative weights W1 W2 that cross), it is possible to avoid output discontinuities in both switching situations. It is also possible to stabilize switching with a hysteresis mechanism, in particular if the predetermined thresholds MD1 and MD2 described above are different.

An aspect of the present invention also relates to a computer characterized in that it includes a system such as described above, or in that it implements a method such as described above. It may be directly a question of a computer dedicated to control of at least one component of a motor-vehicle powertrain, for example an engine control unit, or of an auxiliary computer connected to at least one computer for controlling at least one component of a motor-vehicle powertrain.

BRIEF DESCRIPTION OF THE DRAWINGS

Further aspects, aims and advantages of aspects of the invention will become apparent upon reading the following description of an embodiment of the invention, which is provided by way of a non-limiting example. Aspects of the invention also will be better understood with reference to the accompanying drawings, in which.

DETAILED DESCRIPTION OF EMBODIMENTS

Throughout the various figures, the same reference signs have been used to designate identical or similar elements. For the sake of the clarity of the disclosure, some elements are not necessarily shown to scale.

In the present document, the term "module" designates a set of electronic circuits capable of performing a given function, all of said electronic circuits being programmable and capable of supporting execution of the instructions of a software code. By extension, the term module may designate a complete functional block or even a well-identified physical block.

Here it is the powertrain of a motor vehicle that is of interest, and in particular the vehicle motorization systems, irrespectively of whether they employ a fuel-burning internal combustion engine, or an electric traction motor, or both at the same time.

There are certain quantities of interest that cannot be measured directly in production-vehicle configurations. According to one example, the quantity of interest may be a temperature of a rotor of an electric motor. According to another example, the quantity of interest may be a fuel temperature upstream of injection into the cylinders.

According to yet another example, the quantity of interest may be a temperature of the battery cells in the case of a hybrid vehicle or a vehicle that is 100% electric.

According to yet another example, the quantity of interest may be a flow rate of a fluid, for example in the gaseous phase, for example the intake air in a combustion engine; or else in the liquid phase, for example a flow rate of fuel or a flow rate of coolant.

The quantities of interest described above are used in at least one computer, which, according to the circumstances, controls operation of a combustion or electric powertrain of a motor vehicle, and in particular operation of a combustion engine or an electric traction motor of the vehicle.

In the phases of development of the vehicle or powertrain, the engineers use laboratory means providing access to these quantities of interest. However, in mass-produced vehicles or powertrains, it is not realistic to have such sensors installed and therefore it is not possible to measure the quantity of interest directly. Instead, a system for estimating this quantity of interest must be used.

In this respect, an aspect of the invention provides a system 10 for delivering an estimate of the current value of a quantity of interest, when it is not possible to measure this current value directly.

Figure 1:
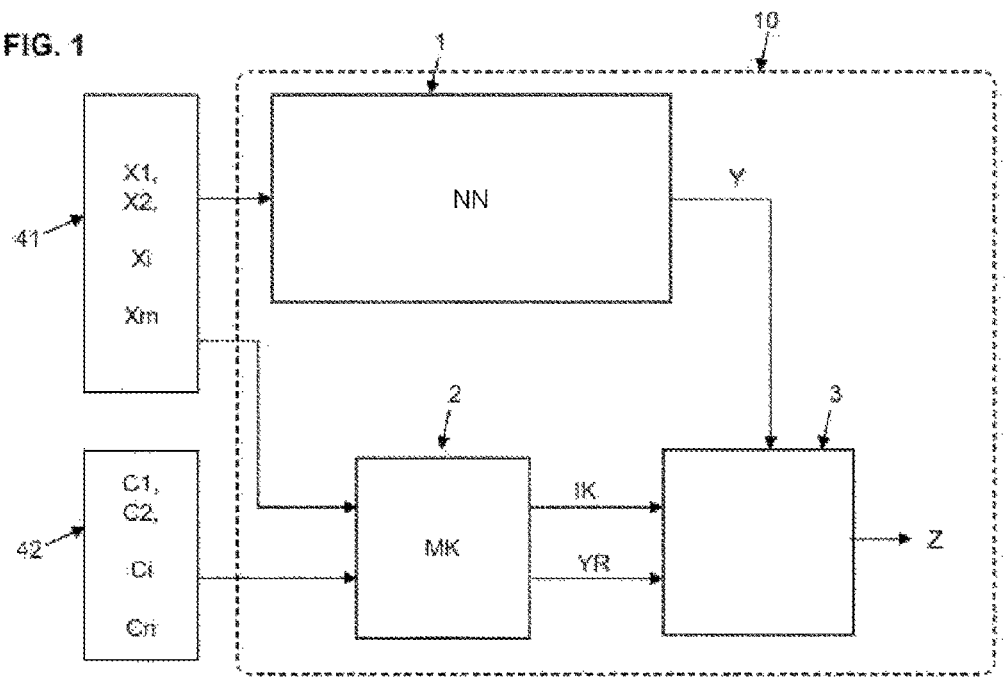
FIG. 1 illustrates a block diagram of one example of a system for determining iteratively at least one quantity of interest according to an aspect of the present invention.

The system 10 comprises a neural-network-based module, referenced 1 or NN, see FIG. 1. The neural-network-based module 1 comprises a computer, and a memory storing a predictive model constructed in a prior learning phase. Said phase of constructing the predictive model implements machine-learning algorithms, which is why reference is made in the example illustrated in practice to a "neural-network-based" module. The predictive model is constructed using measurements obtained with the aid of sensors that are implemented only during this learning phase, and that will no longer be available subsequently, when the system 10 is used under the real conditions of use.

It will be noted that the neural-network-based module is merely one example among other types of supervised-learning-based modules, such as a decision tree, kernel regression or a support-vector machine for example. It is for this reason that it may be stated that the system 10 according to an aspect of the present invention comprises generically a "supervised-learning-based module".

The neural-network-based module 1 receives as input a set 41 of first input data (X1-Xm), and it is configured to deliver as output at least one intermediate output quantity Y.

The intermediate output quantity Y is an estimate of the current value of the quantity of interest, obtained using the predictive model stored in the neural-network-based module 1.

The first input data Xi may comprise a volume flow rate of liquid, at least one fluid temperature, and/or at least one fluid pressure, and/or at least one mechanical-component temperature, and/or at least one speed, and/or the state of at least one actuator, and/or at least one datum relating to surrounding conditions.

In the particular case of a fuel temperature, the first input data Xi may comprise the temperature of the engine coolant, the outside air temperature, the average speed of the vehicle over the last minute, the engine load, a fuel-flow request, the flow rate or amount of fuel consumed in the last 10 seconds, the air temperature under the engine cover, etc.

In the particular case of a temperature of a rotor of the electric traction motor, the first input data Xi may comprise, the outside temperature, the average speed of the vehicle over the last minute, the load placed on the engine over the last 10 seconds, the average speed of the vehicle, the temperature of the stator, the temperature or temperatures of the one or more electric batteries, the air temperature under the motor cover, etc.

It is important to note that the number m of the first input data must not be too great, so as to limit the amount of memory and CPU resources (computing power) consumed and allow the iterative computations to be carried out in real time. In other words, the neural network must be of a reasonable or even minimal size.

According to one example, m may be between 5 and 20.

The system 10 according to an aspect of the invention further comprises a likelihood-checking module, referenced 2 or MK, which receives as input the set 41 of first input data (X1-Xm) and a set 42 of second input data (C1-Cn).

The likelihood-checking module 2 is configured to deliver as output a likelihood index denoted IK.

According to one example, for the set of second input data, n may be between 10 and 30.

Figure 7:
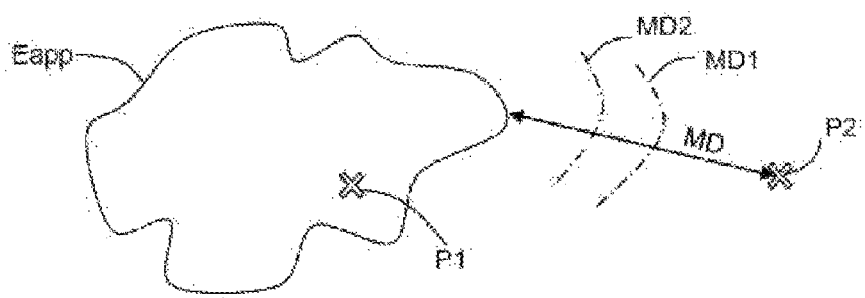
FIG. 7 illustrates a distance-measuring metric used in computation of the likelihood index.

As illustrated in FIG. 7, the likelihood index IK advantageously characterizes a distance metric MD between the set of first input data Xi and a domain of first reference input data Eapp.

The multidimensional space considered may also encompass the second input data Ci, and hence the distance metric MD may also take into account a distance between the set of second input data and a domain of second reference input data.

If for each dimension corresponding to one input datum, X1 for example, the interval of coverage of the supervised learning is expressed in the form [X1min–X1max], and if the current value is outside this interval, the distance X1$d$ separating current X1 from the closest bound (X1min or X1max) is determined. This computation is carried out m times, namely for all the variables/dimensions, and then the distances Xi$d$ are added. This is an example of a distance metric applied to a multidimensional space. A sum of the squares of the individual distances, or any other combination known to those skilled in the art, may be chosen as metric.

As mentioned above, the likelihood index IK may also take into account the second set of input data (variables Cj), following the same logic, to compute distances Cj$d$. The distance metric MD may be the sum of the Xi$d$ and Cj$d$.

Preferably, the distance metric MD is computed in a multidimensional space.

For example, IK=1/MD may be chosen. Therefore, if MD is low or zero, the likelihood index IK is high, or in other words good. In this case, and as detailed below, it may be deemed that confidence may be had in the intermediate output Y of the neural network NN.

Conversely, if MD is high, the likelihood index IK is low, or in other words bad. In this case, and as detailed below, it may be deemed that confidence may not be had in the intermediate output Y of the neural network NN. As detailed below, the system according to an aspect of the invention may then switch to an output representing a physical model, preferably an open-loop model.

For example, in FIG. 7, the first current operational conditions represented by point P1 are inside the domain Eapp employed for the purposes of the supervised learning. In this case, the likelihood index IK is good, and it may be deemed that confidence may be had in the intermediate output Y of the neural network NN.

Conversely, the second operational conditions represented by point P2 are at some distance MD from the domain Eapp, and it may then be decided to switch to an output representing a physical model, preferably an open-loop model.

As illustrated in FIG. 7, the switch to the physical model may occur when the value of the distance metric MD exceeds a first predetermined threshold MD1. Return to normal, i.e. to use of the output of the neural network, may occur when the value of the distance metric drops below a second predetermined threshold MD2 (hysteresis).

The likelihood index IK may also yield a low value in the event of a large discrepancy or inconsistency in the set of data Xi, Cj. The likelihood-checking module 2 may thus comprise an algorithm for checking consistency between certain data, this allowing an obvious malfunction of one of the sources of information to be detected. The likelihood index, in addition to or instead of the distance measurement mentioned above, may be representative of an inconsistency index of the input data.

According to an aspect of the invention, the system 10 further comprises a computer, configured to compute fallback values denoted YR. The fallback values YR are computed using an open-loop model of a physical representation, or physical model. More precisely, a time series $YR(t_k)$ is computed.

Here, the fallback values YR are computed within the likelihood-checking module 2. As a variant, they may be computed in a dedicated module, or in the downstream processing module described below.

For example YR=FR (Ci,Xj), the fallback function FR having been characterized through prior trials on development systems or vehicles.

Lastly, the system 10 according to an aspect of the invention further comprises a downstream processing module 3, which receives as input the likelihood index IK and the intermediate output quantity Y.

The downstream processing module 3 also takes into account the fallback values, denoted YR, which may be computed directly by said downstream processing module 3, or be received as input by the latter as illustrated in FIG. 1. The downstream processing module 3 is configured to deliver as output a final output quantity Z, corresponding to said quantity of interest.

According to an aspect of the invention, the downstream processing module 3 is configured to determine the value of the final output quantity Z, on the basis of the following logic:
when the likelihood index IK is good, the final output quantity Z is representative of the intermediate output quantity Y; and
when the likelihood index IK is bad, the final output quantity Z is in particular obtained from a model of a physical representation. Stated otherwise, the final output quantity is then dependent on the aforementioned fallback values YR.

Figure 3:
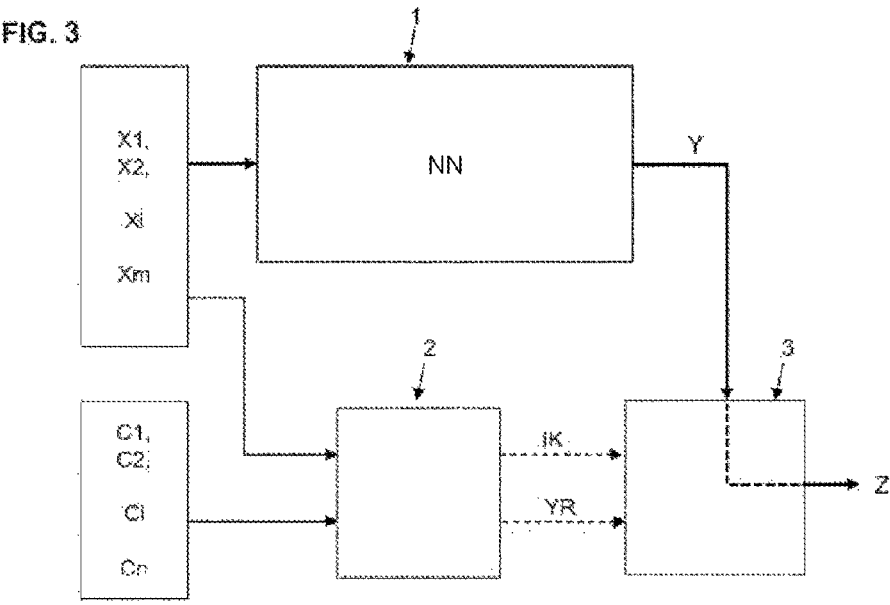
FIG. 3 is analogous to FIG. 1 and shows the block diagram in the normal situation where the neural network is used completely.

In the steady state, in the normal functional case, which is illustrated in FIG. 3, the output is essentially obtained from the intermediate output quantity Y.

Figure 4:
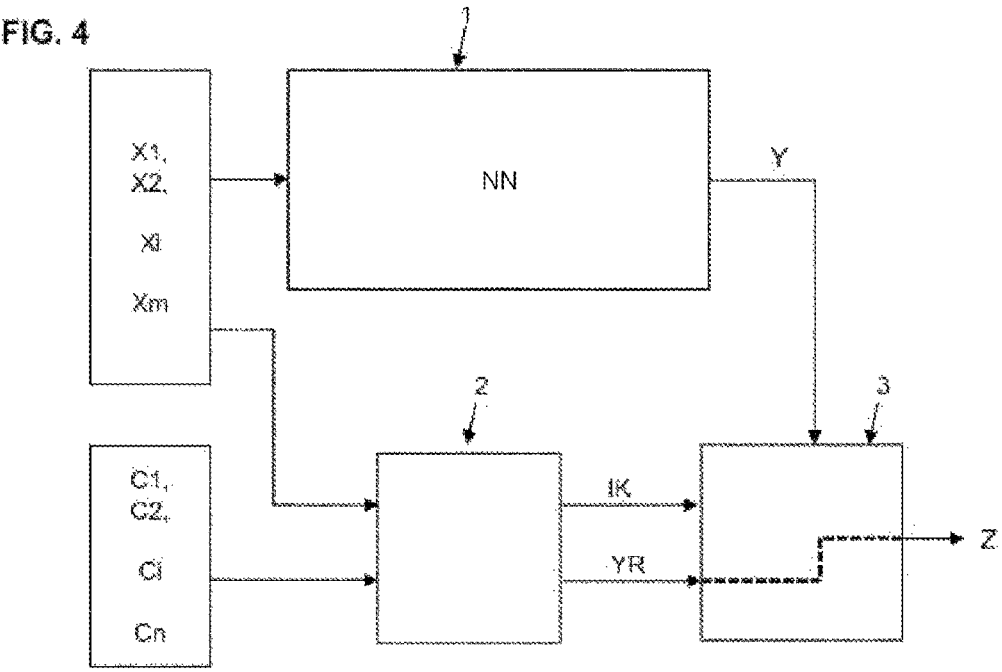
FIG. 4 is analogous to FIG. 1 and shows the block diagram in the situation where a likelihood-checking module intercedes and where the neural network is short-circuited.

Conversely, in the case illustrated in FIG. 4, the output Z is essentially obtained from a function of the fallback values YR.

To ensure the continuity of the output, the switch between the intermediate value Y and the fallback value YR may be gradual, occurring over a time interval of a few seconds.

Figure 5:
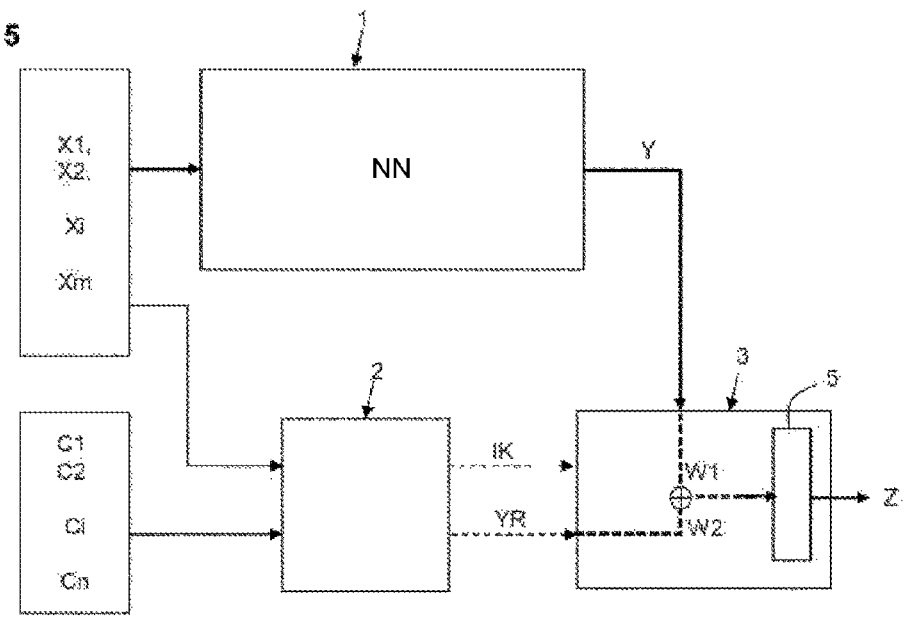
FIG. 5 is analogous to FIG. 1 and illustrates elements of variation, FIG. 6 schematically shows one example of a neural network trained by supervised learning.

For example, the following logic may be applied:

$$Z = W1 \times Y + W2 \times YR,$$

with W1+W2=1, W1 and W2 being respective weights of the intermediate output value Y and of the fallback value YR. This configuration is illustrated in FIG. 5.

A switch from W1=1 to W1=0 may occur gradually, for example in a time window of 5 to 10 seconds. Similarly, a switch from W1=0 to W1=1 may occur gradually, for example in a time window of 5 to 10 seconds.

Figure 2:
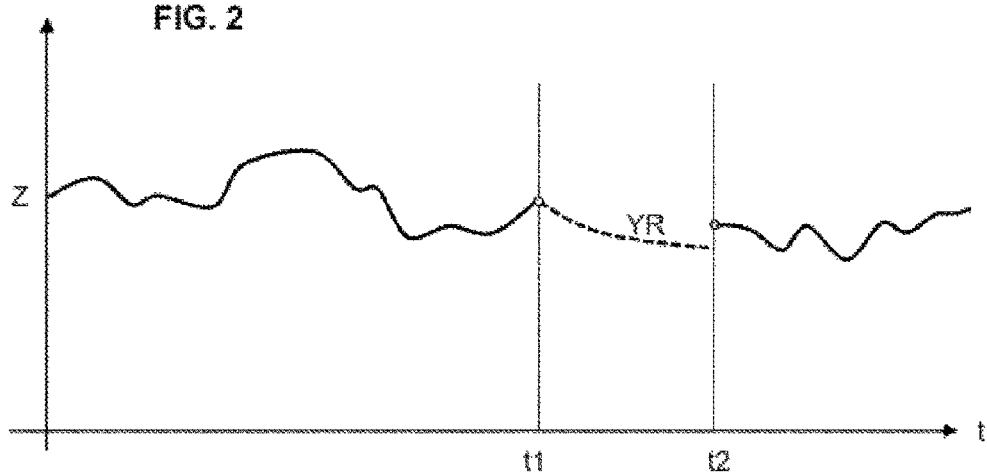
FIG. 2 shows one illustrative example of a timing diagram regarding an output of the system for determining iteratively.

FIG. 2 illustrates the variation, as a function of time, in the final output quantity such as delivered as output by the system 10 according to an aspect of the invention.

Up to the time t1, the downstream processing module 3 operates in a nominal mode in which the final output quantity is essentially obtained from the intermediate quantity Y obtained from the neural-network-based module 1.

At the time t1, a seamless switch, i.e. one without discontinuity, occurs to the open-loop function with the fallback values YR.

At the time t2 a new switch occurs, to return to the case in which the final output quantity is essentially obtained from the intermediate quantity Y obtained from the neural-network-based module 1.

In any case, a function F may be defined that determines the value taken by the final output quantity when the likelihood index IK is bad.

This function F depends, at least, on the fallback value YR, which depends on the Ci and Xj (see fallback function FR mentioned above).

The function F may also depend on:
the intermediate value Y, to ensure continuity of the output,
the time t since a last switch from a good likelihood index to a bad likelihood index, the continuity of the output needing to be ensured only over a predetermined time interval starting from this switch.
The function F may also be dependent on a constant CT, for an optimal continuity of the output.

As mentioned above, in the steady state, the output is essentially obtained from the intermediate output quantity Y, or from the fallback values YR, according to the circumstances.

By "essentially obtained from", what is meant is that the output may be exactly equal to said intermediate output quantity Y or fallback values YR, respectively, or that the output may be obtained by filtering and/or clipping said intermediate output quantity Y or fallback values YR, respectively.

The downstream processing module 3 may therefore comprise a module 5 performing a digital-filtering function and/or a clipping function.

The neural network implemented in the neural-network-based module 1 will now be described with reference to FIG. 6.

The set of first input data X1 to Xm is delivered to an input layer 11 of the neural network. The intermediate layers of the neural network are referenced 12, 13, 14, 15, the output layer giving the value which here is the intermediate output quantity Y.

Figure 6:
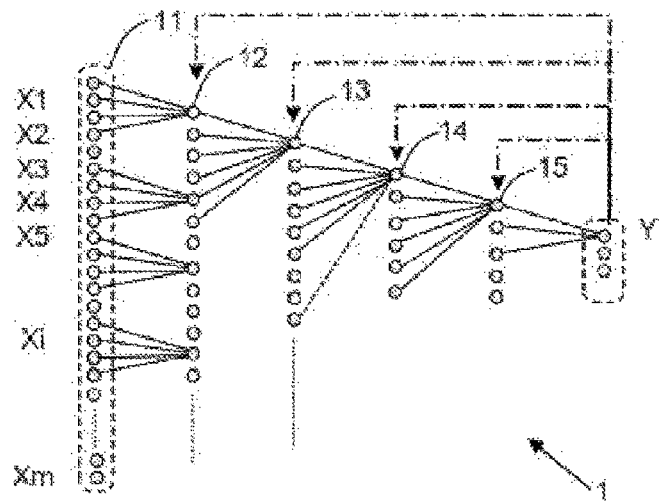

The dash-dotted arrows in FIG. 6 illustrate the learning process, in which the coefficients and weights of the nodes of the neural network are adjusted by means of a cost function computed on the outputs for the whole of the domain where supervised learning is carried out. Once the learning has completed, the coefficients and weights of the nodes are set in the neural network.

Advantageously, the three modules 1, 2, 3 of the system 10 according to an aspect of the invention are contained in a computing unit, which may or may not form an integral part of a control unit for controlling at least one component of a motor-vehicle powertrain.

Of course, the computation of the intermediate quantity Y and the computation of the final output quantity Z are iterative. Preferably, the final output quantity Z is computed at a frequency at least equal to once per second. This proves sufficient if the quantity of interest is a temperature. According to one particular example, the final output quantity Z is computed at a frequency at least equal to once per second, or even 4 times per second.

In the case where the quantity of interest is a flow rate of a fluid, the frequency of computation may be at least equal to 10 times per second. It will be noted here that the neural-network-based module carries out the computations involved in a very short time, and it is the upstream sampling process that is the limiting factor. Of course, it is possible employ a frequency greater than 10 times per second for certain applications.

The invention claimed is:

1. A system for determining iteratively at least one quantity of interest used to control at least one component of a motor-vehicle powertrain, said quantity of interest not being measured directly by a sensor,
   the system comprising:
   a supervised-learning-based estimating module, which receives as input a set of first input data, and which delivers as output at least one intermediate output quantity,
   a likelihood-checking module, which receives as input the set of first input data and a set of second input data, and which delivers as output a likelihood index, the likelihood index characterizing a distance metric between the set of first input data and a domain of first reference input data, and/or between the set of second input data and a domain of second reference input data, and the likelihood index becoming bad the higher the value of the distance metric,
   a downstream processing module, which receives as input the likelihood index and the intermediate output quantity, and which delivers as output a final output quantity corresponding to said quantity of interest,
   the downstream processing module being configured so that:
   when the likelihood index is good, the final output quantity is representative of the intermediate output quantity, the final output quantity then being directly equal to the intermediate output quantity, or corresponding to values of the intermediate output quantity after application of a filter,
   when the likelihood index is bad, the final output quantity is obtained from a model of a physical representation.

2. The system as claimed in claim 1, wherein the supervised-learning-based estimating module is a neural-network-based module.

3. The system as claimed in claim 1, wherein, when the likelihood index is bad, the final output quantity is obtained from a function defined by:

$$Z = F\ (Ci,\ Xj,\ Y,\ t) + CT;$$

with:
Z=the final output quantity
Ci some at least of the data of the set of second input data;
Xj some at least of the data of the set of first input data;
Y the intermediate output quantity;
t a time since a last switch from a good likelihood index to a bad likelihood index; and
CT is a constant.

4. The system as claimed in claim 2, wherein, when the likelihood index is bad, the final output quantity is obtained from a function defined by:

$$Z = F\ (Ci,\ Xj,\ Y,\ t) + CT;$$

with:
Z=the final output quantity
Ci some at least of the data of the set of second input data;
Xj some at least of the data of the set of first input data;
Y the intermediate output quantity;
t a time since a last switch from a good likelihood index to a bad likelihood index; and
CT is a constant.

5. The system as claimed in claim 3, wherein the function is or uses an open-loop-model function.

6. The system as claimed in claim 3, wherein, when the likelihood index changes from good to bad, at a time t1, and the constant is such that the final output quantity is free of discontinuity at the time t1.

7. The system as claimed in claim 6, wherein the function is or uses an open-loop-model function.

8. The system as claimed in claim 1, wherein the quantity of interest is a temperature of a component of the motor-vehicle powertrain.

9. The system as claimed in claim 1, wherein the quantity of interest is a temperature of a fluid in the motor-vehicle powertrain.

10. The system as claimed in claim 1, wherein the downstream processing module comprises a digital-filtering function and/or a clipping function for forming the final output quantity from the intermediate output quantity.

11. The system as claimed in claim 1, wherein the three modules, namely the supervised-learning-based estimating module, the likelihood-checking module, and the downstream processing module are contained in a single control unit.

12. A computer for controlling at least one component of a motor-vehicle powertrain, comprising a system as claimed in claim 1.

13. A method for determining iteratively at least one quantity of interest used to control at least one component of a motor-vehicle powertrain, said quantity of interest not being measured directly by a sensor, the method comprising:
   providing a set of first input data,
   injecting the set of first input data into a supervised-learning-based estimating module,
   obtaining as output at least one intermediate output quantity, providing a set of second input data, injecting the set of first input data and the set of second input data into a likelihood-checking module and obtaining as output a likelihood index, the likelihood index characterizing a distance metric between the set of first input data and a domain of first reference input data, and/or between the set of second input data and a domain of second reference input data, and the likelihood index becoming bad the higher the value of the distance metric, injecting the intermediate output quantity and the likelihood index into a downstream processing module, which delivers as output a final output quantity corresponding to said quantity of interest, when the likelihood index is good, choosing as the final output quantity a value representative of the intermediate output quantity, the final output quantity then being directly equal to the intermediate output quantity, or corresponding to values of the intermediate output quantity after application of a filter, when the likelihood index is bad, choosing as final output quantity values obtained from a model of a physical representation.

14. The method as claimed in claim 13, wherein, when the likelihood index is bad, the final output quantity is obtained from a function defined by:

$$Z = F\ (Ci, Xj, Y, t) + CT;$$

with:
Z=the final output quantity
Ci some at least of the data of the set of second input data;
Xj some at least of the data of the set of first input data;
Y the intermediate output quantity;
t a time since a last switch from a good likelihood index to a bad likelihood index; and
CT is a constant.

15. The method as claimed in claim 14, wherein, when the likelihood index K changes from good to bad, at a time t1, and the constant is such that the output is free of discontinuity at the time t1.

16. A computer for controlling at least one component of a motor-vehicle powertrain, the computer implementing a method as claimed in claim 10.

* * * * *